United States Patent [19]     [11] 3,896,291

Wiedeman     [45] July 22, 1975

[54] CARD READER MECHANISM

[75] Inventor: Charles W. Wiedeman, Castro Valley, Calif.

[73] Assignee: The Singer Company, New York, N.Y.

[22] Filed: Feb. 14, 1974

[21] Appl. No.: 441,181

[52] U.S. Cl. .................... 235/61.11 R; 235/61.11 E

[51] Int. Cl. .......................... G06k 13/02; G06k 7/10

[58] Field of Search ........... 235/61.11 R, 61.11 E, 235/61.11 A, 61.11 B, 61.11 C, 235/61.11 D; 250/555, 566

[56] References Cited

UNITED STATES PATENTS

| | | | |
|---|---|---|---|
| 3,626,159 | 12/1971 | Chumley | 235/61.11 R |
| 3,704,360 | 11/1972 | McFadden | 235/61.11 R |
| 3,706,874 | 12/1972 | Lockard | 235/61.11 E |
| 3,758,754 | 9/1973 | Jensen et al. | 235/61.11 E |
| 3,787,661 | 1/1974 | Moorman et al. | 235/61.11 R |
| 3,790,758 | 2/1974 | Tanigawa et al. | 235/61.11 R |

*Primary Examiner*—Daryl W. Cook
*Attorney, Agent, or Firm*—Edward L. Bell; Joseph R. Dwyer

[57] ABSTRACT

An improved card reader for sensing and readout of Hollerith punched-hole cards. The reader senses the manual entry of a Hollerith card to turn on driving rollers which grasp and press the card inward into the mechanism. The leading edge of the punched card then comes into contact with a flange-head which is part of a strobe bar carriage. The pressure of the inwardly driven Hollerith card causes the front edge of the Hollerith card to press against the head and to initiate forward motion of the strobe bar carriage.

The strobe bar carriage carries a linear bar with a series of precisionly spaced apertures in its base which are used to trigger a strobing signal as each column of the punched card passes over the read station. The read station puts out a set of signals indicative of the pattern of each column of the Hollerith card. When the last column of the Hollerith card is read, a reverse sensing photocell is triggered which drives the card backward out of the entry slot. A return spring retracts the strobe bar carriage back to its initial position adjacent the entry slot of the card reader. The strobe bar flange and carriage is made to contain a heavier mass than that of the Hollerith card and is at least of equal width to that of the width of the Hollerith card so that any "skewness" of the Hollerith card in the entry slot will be rectified when the edge of the Hollerith card is flatted against the strobe bar head. Further, the thrust of the Hollerith card will not cause bounce or jerk of the strobe bar carriage (which might lead to reading errors) but will merely accelerate the strobe bar carriage in a smooth fashion.

12 Claims, 4 Drawing Figures

PATENTED JUL 22 1975

3,896,291

SHEET 1

CARD READER MECHANISM

BACKGROUND: PRIOR ART

One of the problems involved in the prior art in regard to the reading of punched-hole Hollerith cards with card readers has been errors which might occur during the readout operation of the card, which normally has 80 vertical columns. Generally, the card readout operation is done by sensing the established columns of the Hollerith card to determine whether various specified spaces have or do not have a punched hole in them. This sensing of the punched hole positions can be done by mechanical sensor, photocell, or light emitting devices with photocell pickups or other types of hole sensing devices. One of the preferred sensing methods is with the use of light emitting devices which can pass through the punched hole in the Hollerith card and be sensed by a photocell. Generally, there is provided a "read" station which is a vertical line of light emitting units over which is passed the various columns of the punched card in sequence. As long as the punched card is flat and in properly direct columnar alignment across the readout station, then the reliability of getting an accurate readout is high. However, should the Hollerith card be skewed or turned at an angle so that the column of the Hollerith card does not align properly with the linear line of the readout station, then, of course, errors may occur. Further, if the Hollerith card does not lie flat but is bent, bowed, or in a bouncing or oscillatory condition, then, of course, there is also the possibility of errors in readout.

The present invention, provides for the readout of Hollerith cards such that any misalignment or skew of the Hollerith card in its travel over the readout station is eliminated. Further, any vibration or bounce, as might have occurred in units of the prior art, have now been eliminated so that the card will not bounce or vibrate and will ride past the sensing and readout station in a smooth, correctly aligned manner.

SUMMARY OF THE INVENTION

The card reader of the present invention comprises a central passage channel having a pair of side guide plates which carry a flat bed. An entry slot is provided at one end whereby, upon the insertion of a punched card, an entry sensing photocell will trigger a motor to drive upper and lower drive belts which grasp the edge of the inserted card and carry it forward to a read station. A "strobe bar carriage" is provided to contact the Hollerith card and to be accelerated into forward motion by the leading edge of the card as it is driven inward. The strobe bar carriage has a transverse flange-head against which the leading edge of the inserted card will abut. The thrust of the punched card will carry the strobe bar carriage forward through the machine across the read station to the other end of the machine after which a "reverse" photocell sensor will reverse the forward motion so that the card will then be driven backward and out of the machine through the entry slot.

The strobe bar carriage constitutes a movable carrier which has a vertical flange cross piece having a head (against which the leading edge of the Hollerith card can abut). This flange-head is approximately equal width to the card and of greater mass so that the thrust of the card against the flange-head will not cause a sudden jerking movement of the strobe bar carriage but will rather cause the strobe bar carriage to accelerate in a smooth fashion. The strobe bar carriage includes a flat metallic strip designated as the strobe bar which rides a slot in the base of the reader. This strip is provided with a linear series of precisionly spaced holes or apertures which serve the purpose of triggering a strobing circuit each time one column of the card aligns itself over the readout station.

The thrust of the driving belts against the side edges of the punched card causes the card's leading edge to abut against the strobe bar head, causing the strobe bar apertures to move toward the read station. When the entire set of columns of the punched card have passed, one-by-one, across the readout station, a reverse sensor, at the opposite end of the card reader, senses that the card has completed its inward trip and reverses the drive motor and the driving belts for the rollers, so that the card is driven back along the bed of the card reader and out of the entry slot. The actual strobe bar carriage is returned back to its initial position near the entry slot by means of a strobe bar return spring which is activated or put into tension during the initial motion of the strobe carriage by the punched card.

The right and left guide plates of the entry slot are not sufficient for preventing skewing or misalignment of an inserted Hollerith card since a certain amount of tolerance must be permitted for temperature and humidity conditions, and for slight variations in width of the Hollerith cards. However, any misalignment or skew which arises in the inserted Hollerith card is quickly corrected when the front leading edge of the Hollerith card strikes the strobe bar head of the strobe bar carriage whose mass is just sufficient to cause the leading edge of the Hollerith card to align properly along the strobe bar flange-head since the gentle grasp of the drive belts against the card permit alignment of the card before it can move through the read station.

The strobe bar carriage is made of at least 8 times greater mass than the punched card, yet is not made of such a heavy mass that the card will fold, or crush. The mass of the stobe bar carriage is such that a smooth, gentle, acceleration of the strobe bar, flange-head, and carriage will occur as a result of the forward thrust of the Hollerith card, thus insuring a smooth, nonvibratory and nonbouncing passage of the Hollerith card, column-by-column, across the read station.

DESCRIPTION

Figures 1, 2A, 2B, 2C:
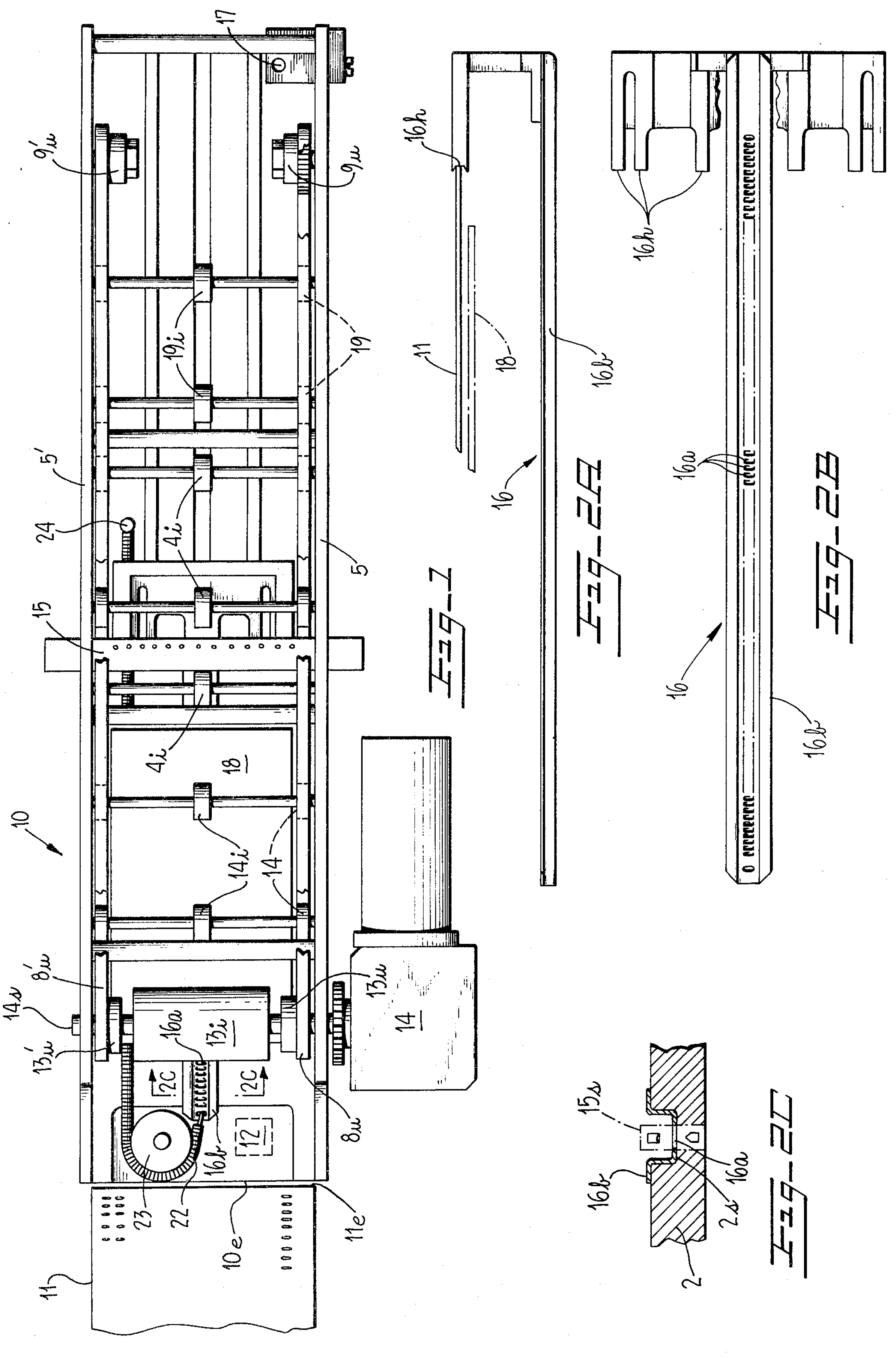
FIG. 1 is a top or plan view of the subject card reader, showing the major elements utilized.
FIG. 2A is a side or elevation view of the strobe bar carriage.
FIG. 2B is a top view of the strobe bar carriage showing the strobe bar with apertures and the head portion of the strobe bar carriage.

Referring to FIG. 1, a card reader 10 having side walls 5 and 5' and an entry slot $\mathbf{10}_e$ through which a Hollerith punched card may be inserted is seen from a top view.

The side walls 5 and 5' are supported by a base 2 (FIG. 3) and also support a bed plate 18. Walls 5 and 5' also support a series of shafts for the driving rollers and the idler rollers of which the main entry drive roller is shown as upper roller $13_i$, and lower roller $13'_i$, (not shown in this drawing).

Auxiliary idler rollers $14_i$, $4_i$, and $19_i$ are also mounted on shafts supported by the side walls 5 and 5'.

A driving motor 14, adjacent side wall 5, drives shaft 14, which turns side drive rollers $13_u$ and $13'_u$, in addition to turning entry drive rollers $13_i$ and $13'_i$. The drive roller $13'_i$ resides below roller $13_i$ and is not shown in FIG. 1. The turning of pulleys or side drive rollers $13_u$ and $13'_u$ will drive the belts $8_u$ and $8'_u$, which will also turn the rear side rollers $9_u$ and $9'_u$.

Just adjacent the entry slot $10_e$, there is placed a photocell sensor 12 which is used for purposes of entry sensing of an inserted card. At the opposite end of the reader is placed a reverse photocell sensor 17 which senses when the Hollerith card has come to the end of its travel on its inward journey.

At approximately the center of the card reader there is a transverse strip which houses the read station 15 which comprises a series of light emitting diodes and photocell pickups which are placed in linear alignment so that as a column of the Hollerith card passes through, it may be sensed completely along its width for the appearance or nonappearance of punched holes in each line of that column.

A bed plate 18 just below the entry slot $10_e$ provides support for the incoming card 11.

A strobe bar $16_b$ is attached to spring 22 which wraps around abutment 23 to be anchored at pin 24.

FIG. 2A is a side view of a strobe bar carriage 16 having a strobe bar $16_b$, a vertical area called the strobe bar flange-head $16_h$.

In FIG. 2B there is seen a top view of the strobe bar carriage 16 showing in greater detail the strobe bar $16_b$ as having a series of apertures $16_a$ along the length thereof.

Referring to FIG. 2A, there is seen in dotted lines a bed plate 18 on which the punched card rides until the leading edge of the card abuts against the vertical strobe bar flange-head $16_h$.

In FIG. 2C, a cross section of base 2 of the card reader 10 is shown having a slot $2_s$ in which the strobe bar $16_b$ may slide, so that a series of apertures in the strobe bar may trigger sensor $15_s$ into generating a strobing signal.

The strobe bar carriage 16 is fabricated to have a mass of at least 8 to 10 times the mass of an individual punched card.

Figure 3:
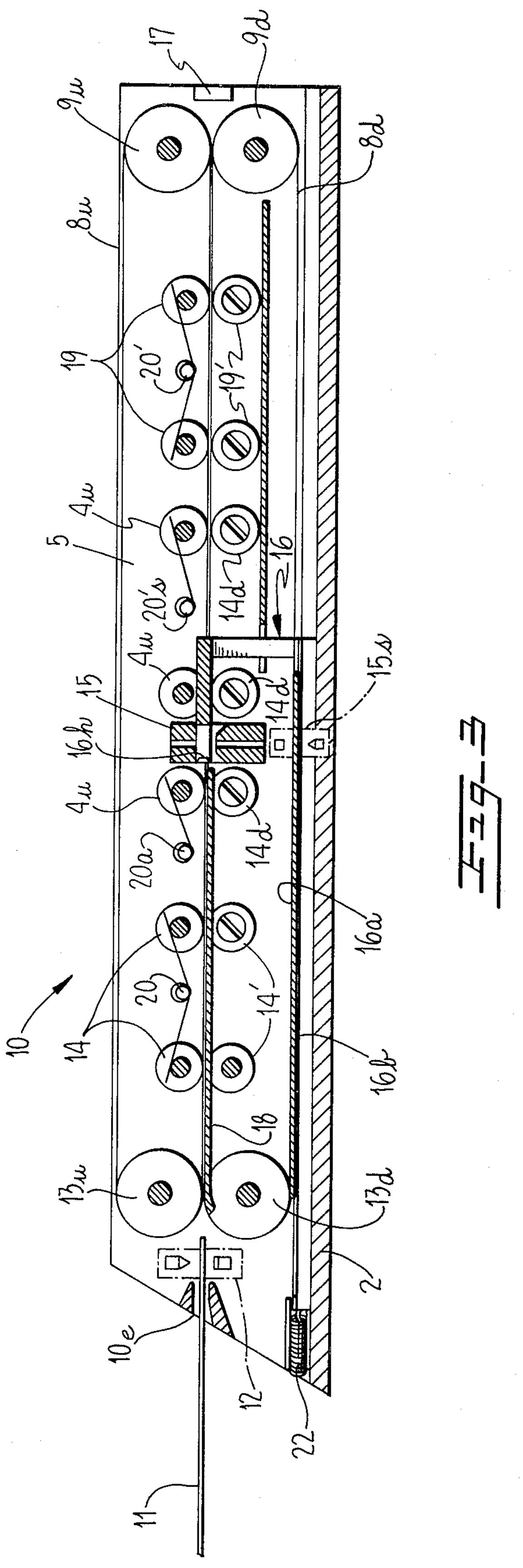
FIG. 3 is a side view of the card reader.

Referring to FIG. 3, a side view of the improved card reader is shown having a base 2, a side wall 5, and an entry slot $10_e$, wherein the card 11 may be inserted.

An upper belt $8_u$ is driven by side roller $13_u$ and is supported at the opposite end by the side roller $9_u$. Likewise, a lower belt $8_d$ is driven by side roller $13_d$ and the belt is supported at the opposite end by the side roller $9_d$.

As seen in FIG. 1, a similar set of drive belts and rollers is provided on wall 5' such as shown by belt $8'_u$ and side drive roller $13'_u$, and support roller $9'_u$.

Referring again to FIG. 3, the drive belts $8_u$ and $8_d$ are guided so as to touch and run together in parallel through the central plane of the reader.

A series of lower idler rollers 14', $4_d$, and 19' are placed at intervals under the upper portion of the lower belt $8_d$.

These idler support rollers are fixed into position and provide base points against which the upper rollers 14, $4_u$, and 19, may press against, doing so by pressing together the two belts $8_u$ and $8_d$.

The series of upper rollers shown at 14, $4_u$, and 19, are also provided with torsion springs 20, 20', $20_a$, and $20'_a$, which torsion springs provide a downward thrust on the upper rollers so that in the central plane (card channel), the parallel proximate belts $8_u$ and $8_d$ will be gently pressed together.

Further, in FIG. 3, the strobe bar carriage 16 is shown with its flanged-head $16_h$ adjacent the read station 15 while the strobe bar $16_b$ is seen riding on the base 2 so that the apertures $16_a$ will pass by the strobing generator station $15_s$.

An entry sensor 12 comprises a light emitting diode and photocell combination to detect entry of a punched card. Likewise, at the opposite end of the reader there is also provided a sensor 17 for purposes of reversing the motor and belt drive when the punched card has completed the end of its inward travel.

Spring 22 provides tension for returning the strobe bar carriage 16 to its home position after the carriage has been carried to the opposite end of the reader by the thrust of an inwardly driven punched card.

OPERATION

Referring to FIG. 1, a Hollerith type punched card 11 may be inserted into the entry slot $10_e$. Upon entry of the card, a photocell entry sensing device 12 will detect the leading edge of the card and trigger a signal for turning on the drive motor 14.

Upon energization of the drive motor 14, the drive motor 14 will drive pulleys $13_u$ and $13'_u$ thus turning upper belts $8_u$ and $8'_u$ (and the corresponding lower belts) on the right and left side of the card reader thus turning entry drive rollers $13_i$ (FIG. 1) and $13'_i$. These upper and lower drive belts $8_u$ and $8_d$ will pull card 11 inwardly across bed plate 18 (FIG. 3) since the side edges of card 11 will be grasped between these belts and carried forward until the leading edge $11_e$ of card 11 abuts against the strobe bar carriage head $16_h$.

The punched card 11 is thus carried by the moving belts toward the read station 15 of the card reader. Then, the leading edge $11_e$ will be pushed against the flange-head $16_h$ such that the strobe bar carriage 16 will be accelerated into motion and driven smoothly forward to the opposite end of the card reader.

As is usually the case, the punched card is seldom exactly in alignment when it enters the entry slot $10_e$ and is generally in a skewed or angular condition. It is mandatory that the longitudinal axis of the punched card be precisely perpendicular to the read station 15 so that only one column of the card will be accurately aligned on the read station, at any given moment. Should there be sufficient skew in the card, then the misalignment of a column of the punched card could cause false or incorrect reads as the card passes over the line of photocells in the read station.

In the present invention, the combination of the strobe bar carriage 16 and the driving motion of the upper and lower drive belts $8_u$ and $8_d$ will cause the leading edge $11_e$ of the punched card to strike the stobe bar head $16_h$ in such a manner that the card will straighten and align itself in a perpendicular fashion to the readout station. This is so because the strobe bar carriage 16 has a mass factor which is at least 8 to 10 times that of the mass factor of the punched card itself. Thus, before the strobe bar carriage can accelerate (due to the abutment of the leading edge of the punched card) the mass of the strobe bar carriage 16 is sufficient to delay the acceleration of the strobe bar carriage which causes deceleration of the constant velocity driven card by allowing slip between the driving belt and the driven card.

The deceleration of the card rather than the infinte acceleration of the strobe bar carriage 16 negates the possibility strobe bar bounce upon card impact against the strobe bar flange-head $16_h$, thus insuring that no false strobing signal is generated.

If the mass of the strobe bar carriage were too large in relationship to the punched card, another problem would present itself and that would be of card crushing, especially of wet or oily cards (low strength cards).

On the other hand, if the mass of the strobe bar carriage 16 and the strobe bar flange $16_f$ were so small in relationship to the driving force of the leading edge of the punched card, then the strobe bar carriage would be suddenly accelerated ahead of the leading edge of the punched card causing a false strobe signal and no longer providing an aligning member for the skewed card.

Thus, by proper apportioning of mass in the strobe bar carriage in relationship to the punched card and the driving force behind it, a condition may be created by which the punched card is sufficiently delayed, momentarily, in order to align itself against the flange-head $16_h$ after which the strobe bar carriage will accelerate through the reader in a smooth even pattern.

The lower portion of the strobe bar carriage 16 is designated as the strobe bar $16_b$. As seen in FIGS. 2A and 2B, the strobe bar $16_b$ carries a series of apertures $16_a$ which are precisionally spaced in such a manner that they may be used to trigger a strobe signal in sensor $15_s$ so that output signals will occur exactly when a column was precisely located over the sensors of the readout station 15.

The punched hole card and the strobe bar carriage 16 are thus driven across the central readout station 15 onward to the other end of the card reader at which time a reverse sensor 17 detects the leading edge of the punched card, and provides a signal to reverse the drive motor 14.

Upon reversal of the drive motor 14, the drive belts $8_u$ and $8'_u$ will be driven in the reverse direction so that the punched card is then carried backwards out of the entry slot $10_e$.

Referring to FIG. 1, the forward motion of the strobe bar carriage 16 will elongate or cause tension to the return spring 22.

When the "reverse" sensor 17 has been activated to reverse the drive belts $8_u$ and $8'_u$, the card 11 will be carried back outward to the entry and will no longer be pushing against strobe bar carriage 16 which can now be returned to its home position by the pull of tension spring 22.

Thus, in the card reader of this invention, a punched card is held and fed in a flat path which is not deformed or twisted in any respect. Further, the punched card travels over the readout station in longitudinally perpendicular condition eliminating any skew angle or bounce effect. While some types of card readers use a very tight grasping of the card by drive rollers with heavy tension, the card reader herein only imparts a gentle rapid thrust by pressing the card between two moving belts in order to permit slippage for alignment purposes. Thus, while passing the read station, the card remains in longitudinally perpendicular alignment because of the impact of the leading edge against the strobe bar head. The card skew is thus corrected by impacting the card against the wider and more massive strobe bar carriage having at least 8 times the mass of the card. The inward movement of the card is made very rapid even though only gently grasped by the drive rollers, and, as the fast moving card impacts the flange-head, the flange mass tends to force the card to move slightly between the drive belts, thus aligning the leading edge of the card flat against the flange-head. Further, since the mass of the strobe bar carriage is at least 8 times greater, there is no sudden bounce or sudden acceleration of the strobe bar on being struck by the moving card. In this respect, alignment of the card, plus reduced bounce of the strobe bar, occurs in a fashion which tends to increase the reliability of reads, to provide a card reader of simple design and increases reliability.

What is claimed is:

1. In a card reader for reading a punched card and having a planar transport channel and a read-out station, the combination comprising:

a. card transport means for transporting a punched card into and out of said card reader, wherein said card transport means includes means for grasping the longitudinal edges of a punched card in a yieldable fashion;

b. means for longitudinally aligning an inserted punched card to insure a proper vertical column alignment of each column across said read-out station, and wherein said means for longitudinally aligning a card includes a movable carriage having a flange-head for abutting the leading edge of an inwardly driven punched card, said flange-head precipitating slippage of the longitudinal edges of said incoming punched card when one portion of the leading edge of said punched card strikes said flange-head before the remainder of the leading edge does so, causing the correct alignment of said punched card in said planar transport channel;

c. means for triggering a strobe signal upon the correct placement of a vertical column of the punched card in said read-out station.

2. The card reader of claim 1 wherein said means for grasping the longitudinal edges of a punched card includes:

a. two sets of upper and lower drive belts each having a parallel contacting common area along the planar transport channel.

3. The card reader of claim 1 wherein said means for aligning includes:

a. means for providing smooth nonvibratory accelerative movement of said punched card through said read station.

4. The reader of claim 3 wherein said means for providing smooth nonvibratory movement includes a movable carriage having a mass at least 8 times greater than the mass of said punched card.

5. The reader of claim 4 wherein said movable carriage includes:

a. a movable linear bar having means for triggering a strobe signal at the readout station during each column alignment of the card on the readout station, and b. a flange-head for abutting the leading edge of an incoming punched card.

6. In a punched card reader having a planar transport channel and a readout station, the combination comprising:

a. a strobe bar carriage movable by the leading edge of an indriven punched card, said carriage including:

a-1. a linear strobe bar having means to trigger a strobing signal at precision intervals corresponding to moments when a vertical card column of said punched card is in direct alignment over said readout station;

a-2. a raised flange-head for contacting the leading edge of said inwardly driven card;

b. card transport means for yieldably grasping and transporting a punched card via the longitudinal edges thereof;

c. sense means responsive to said strobe bar trigger means;

d. track means for guiding said strobe bar carriage past said sense means;

e. retraction means for returning said strobe bar carriage to its initial position.

7. The reader of claim 6 wherein said means to trigger a strobing signal includes a series of precisionally spaced apertures linearly placed in said strobe bar.

8. The reader of claim 6 wherein said strobe bar carriage is sufficiently greater in mass than said indriven punched card as to cause proper realignment of said card when the leading edge of said card abuts against said flange-head.

9. In a punched card reading apparatus for driving a punched card past a readout station to read out sequentially the information bearing columns of said punched card, the improvement comprising:

a. a movable strobe bar carriage having at least eight times the mass of the punched card and including:

a-1. a strobe bar having linear apertures precisionally spaced thereon for triggering a strobe signal when a card column is in direct alignment across said readout station;

a-2. a flange-head for abutting the leading edge of an incoming punched card such that the driven punched card will smoothly accelerate said strobe bar carriage into motion past said readout station;

b. double upper and lower belt drive means for driving each longitudinal edge of said punched card with a sufficiently gentle grasp that realignment of said card may occur upon its leading edge striking the said flange-head.

10. The reading apparatus of claim 9 including retraction means for returning said strobe bar carriage to its initial position after a card is read out.

11. In a punched card reader having an entry slot, a planar card transport channel, a readout station, and transport means for transporting said punched card through said readout station, the combination comprising:

a. card entry sensing means to start said transport means to drive a punch card inwardly into said reader:

b. a strobe bar carriage having a flange-head for abutting the leading edge of an inwardly transported punch card and capable of forward movement due to impact of the card's leading edge against said flange-head of said carriage;

c. said transport means including means for grasping the longitudinal edges of said punched card in a yieldable fashion so that edge slippage can occur when one portion of the leading edge of said punched card strikes the flange-head of a strobe bar carriage before the rest of the leading edge has done so.

12. In a punched card reader having a planar card transport channel and transport means for moving a punched card into and out of a readout station, the improvement comprising:

a. a movable strobe bar carriage for receiving an incoming punched card, said carriage having a flange-bar for aubtting the leading edge of the punched card such that the driving motion of the punched card will accelerate the strobe bar carriage in a smooth uniform manner;

a-1. said strobe carriage including a linear strip of apertures whereby each of said apertures, on passing a sensor, will trigger an output strobe signal each time a vertical column of the punched card is properly positioned.

* * * * *